(12) United States Patent
Kantorovskiy et al.

(10) Patent No.: US 10,333,936 B2
(45) Date of Patent: Jun. 25, 2019

(54) METHOD AND SYSTEM FOR SECURE CROSS-DOMAIN LOGIN

(71) Applicant: Box, Inc., Redwood City, CA (US)

(72) Inventors: Lev Kantorovskiy, Mountain View, CA (US); Kechen Huang, San Francisco, CA (US); Nakul Chander, San Francisco, CA (US); Anil Chaurasia, San Francisco, CA (US); Benjamin Kus, San Francisco, CA (US)

(73) Assignee: Box, Inc., Redwood City, CA (US)

( * ) Notice: Subject to any disclaimer, the term of this patent is extended or adjusted under 35 U.S.C. 154(b) by 265 days.

(21) Appl. No.: 15/413,519

(22) Filed: Jan. 24, 2017

(65) Prior Publication Data
US 2018/0212965 A1    Jul. 26, 2018

(51) Int. Cl.
*H04L 29/06* (2006.01)
*H04L 29/08* (2006.01)

(52) U.S. Cl.
CPC .......... *H04L 63/10* (2013.01); *H04L 63/0807* (2013.01); *H04L 63/0815* (2013.01); *H04L 67/02* (2013.01); *H04L 67/10* (2013.01); *H04L 67/141* (2013.01); *H04L 67/146* (2013.01); *H04L 67/2814* (2013.01); *H04L 67/42* (2013.01); *H04L 63/083* (2013.01); *H04L 63/0861* (2013.01)

(58) Field of Classification Search
CPC . H04L 63/0815; H04L 63/10; H04L 63/0807; H04L 63/083; H04L 63/0861; H04L 67/02; H04L 67/10; H04L 67/141; H04L 67/146; H04L 67/2814; H04L 67/42
See application file for complete search history.

(56) References Cited

U.S. PATENT DOCUMENTS

| | | | |
|---|---|---|---|
| 8,909,749 B2* | 12/2014 | Branch | G06F 9/4856 709/217 |
| 9,137,131 B1* | 9/2015 | Sarukkai | H04L 43/0876 |
| 9,369,443 B1* | 6/2016 | Sinor | H04L 63/045 |
| 2013/0007867 A1* | 1/2013 | Sowatskey | H04L 63/0815 726/8 |
| 2013/0311894 A1* | 11/2013 | Rexer | G06Q 10/10 715/741 |
| 2014/0201809 A1* | 7/2014 | Choyi | H04L 63/0807 726/3 |
| 2014/0282940 A1* | 9/2014 | Williams | H04L 63/0815 726/6 |
| 2015/0135302 A1* | 5/2015 | Cohen | H04L 67/2823 726/12 |

(Continued)

*Primary Examiner* — James R Turchen
(74) *Attorney, Agent, or Firm* — Sheridan Ross P.C.

(57) ABSTRACT

Techniques are described for separating subdomains as part of a secure login process. For example the subdomains can correspond to an enterprise user or personal user accounts, or both. The login process involves responding to a login request with an assertion, such as for example a redirect based assertion, that includes an encrypted data structure with account and user information necessary for identification of the corresponding subdomain. The encrypted data structure includes browser-, IP address, and user-specific information to thwart a cross-site request forgery (CSRF) security vulnerability, among other things.

20 Claims, 10 Drawing Sheets

(56) References Cited

U.S. PATENT DOCUMENTS

| | | | |
|---|---|---|---|
| 2015/0188906 A1* | 7/2015 | Minov | H04L 63/0815 726/8 |
| 2016/0048932 A1* | 2/2016 | McNelley | G06Q 50/01 705/5 |
| 2016/0087970 A1* | 3/2016 | Kahol | H04L 63/0281 726/8 |
| 2016/0219044 A1* | 7/2016 | Karunakaran | G06F 21/33 |
| 2017/0180351 A1* | 6/2017 | Lu | H04L 63/061 |
| 2017/0187705 A1* | 6/2017 | Shim | H04L 63/0815 |
| 2017/0346856 A1* | 11/2017 | Newell | H04L 63/20 |
| 2018/0091355 A1* | 3/2018 | Tamura | G06F 21/41 |

* cited by examiner

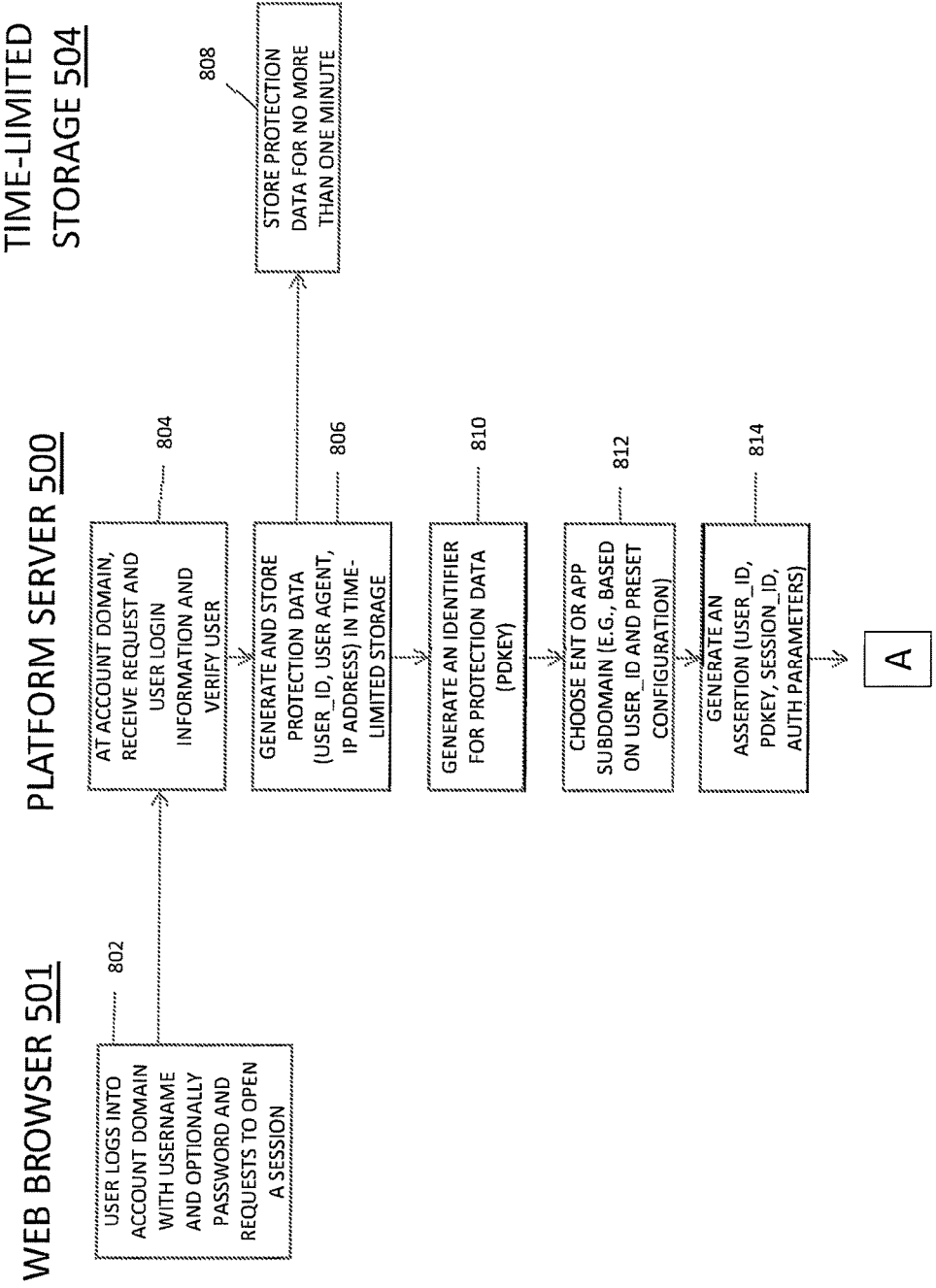

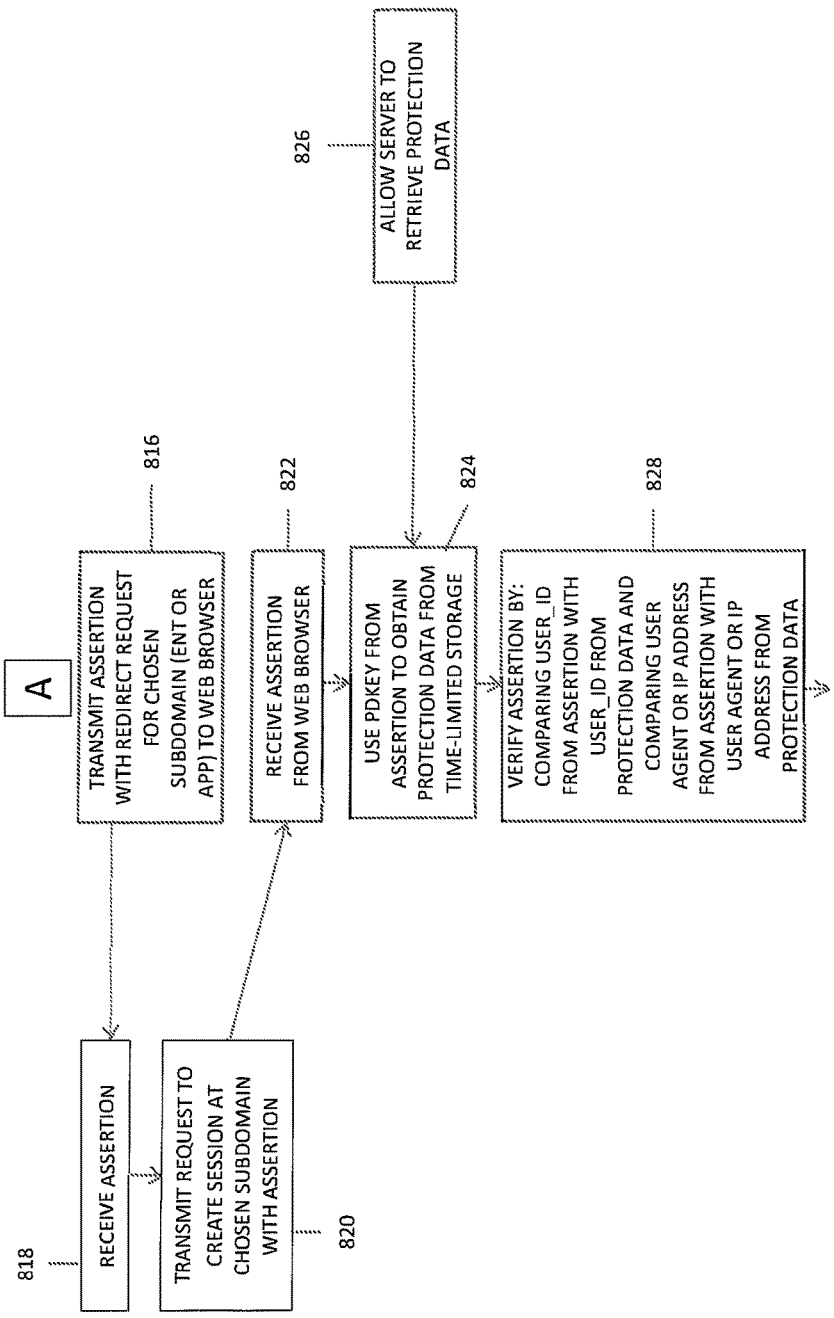

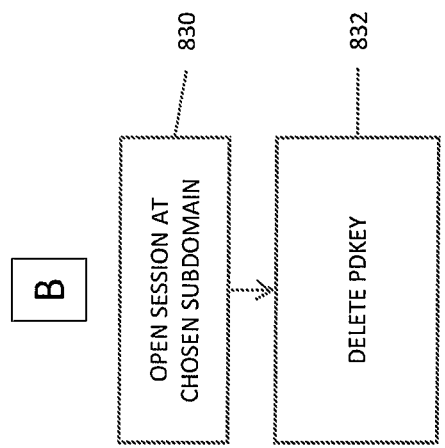

METHOD AND SYSTEM FOR SECURE CROSS-DOMAIN LOGIN

BACKGROUND

Many security-conscious or regulated companies have a requirement to block personal file-sharing sites such as cloud-based collaboration file and/or service sharing sites. For example, on cloud-based collaboration file and/or service sharing sites, companies typically use network firewall rules to allow only enterprise-related accounts and to block other accounts, e.g., personal user accounts.

BRIEF DESCRIPTION OF THE DRAWINGS

FIG. 8 is a flow diagram illustrating an exemplary server flow for performing a secure cross-domain login.

DETAILED DESCRIPTION

Figure 1:
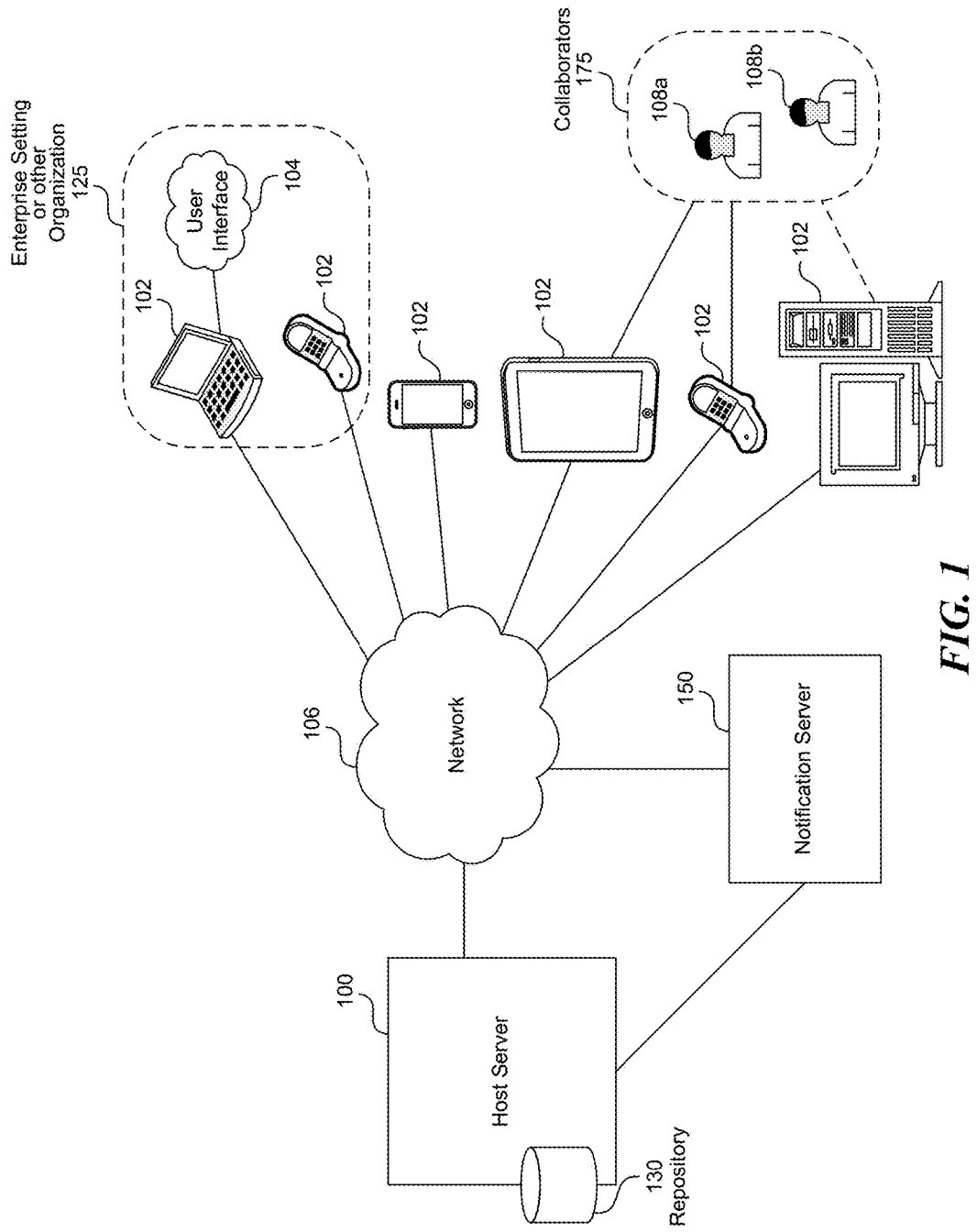
FIG. 1 contains a diagram illustrating an exemplary system for secure cross-domain login to a collaboration service.

Many security-conscious or regulated companies have a requirement to block personal file-sharing sites such as cloud-based collaboration file and/or service sharing sites. For example, on cloud-based collaboration file and/or service sharing sites, companies use network firewall rules to allow only enterprise-related accounts and to block other accounts, e.g., personal user accounts. It would be advantageous for a cloud-based collaboration platform to provide an enterprise subdomain that allows customers to easily block personal users on internal networks while allowing use of the cloud-based collaboration platform for verified enterprises. Further, it would be advantageous to provide an enterprise subdomain that allows networks to easily differentiate between enterprise accounts, which often companies do not want to block, and personal accounts. Further, the enterprise subdomain may allow networks to bypass restrictions placed on personal cloud-based collaboration platform accounts.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but no other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Embodiments of the present disclosure include systems and methods for secure cross-domain login in a collaboration environment including a cloud-based platform (e.g., cloud-based file sharing, collaboration, and/or storage platform/service).

FIG. 1 contains a diagram illustrating an exemplary system for secure cross-domain login to a collaboration service.

The client devices 102 can be any system and/or device, and/or any combination of devices/systems that is able to establish a connection, including wired, wireless, cellular connections with another device, a server and/or other systems such as host server 100 and/or notification server 150. Client devices 102 typically will include a display and/or other output functionalities to present information and data exchanged between among the devices 102 and/or the host server 100 and/or notification server 150.

For example, the client devices 102 can include mobile, hand held or portable devices or non-portable devices and can be any of, but not limited to, a server desktop, a desktop computer, a computer cluster, or portable devices including, a notebook, a laptop computer, a handheld computer, a palmtop computer, a mobile phone, a cell phone, a smart phone, a PDA, a Blackberry device, a Treo, a handheld tablet (e.g. an iPad, a Galaxy, Xoom Tablet, etc.), a tablet PC, a thin-client, a hand held console, a hand held gaming device or console, an iPhone, and/or any other portable, mobile, hand held devices, etc. running on any platform or any operating system (e.g., Mac-based OS (OS X, iOS, etc.), Windows-based OS (Windows Mobile, Windows 7, etc.), Android, Blackberry OS, Embedded Linux platforms, Palm OS, Symbian platform. In one embodiment, the client devices 102, host server 100, and app server 110 are coupled via a network 106. In some embodiments, the devices 102 and host server 100 may be directly connected to one another.

The input mechanism on client devices 102 can include touch screen keypad (including single touch, multi-touch, gesture sensing in 2D or 3D, etc.), a physical keypad, a mouse, a pointer, a track pad, motion detector (e.g., including 1-axis, 2-axis, 3-axis accelerometer, etc.), a light sensor, capacitance sensor, resistance sensor, temperature sensor, proximity sensor, a piezoelectric device, device orientation detector (e.g., electronic compass, tilt sensor, rotation sensor, gyroscope, accelerometer), or a combination of the above.

Signals received or detected indicating user activity at client devices 102 through one or more of the above input mechanism, or others, can be used in the disclosed technology by various users or collaborators (e.g., collaborators 108a and 108b, collectively represented as collaborators 175) for accessing, through network 106, a web-based collaboration environment or online collaboration platform (e.g., hosted by the host server 100).

The collaboration platform or environment hosts workspaces with work items that one or more users can access (e.g., view, edit, update, revise, comment, download, preview, tag, or otherwise manipulate, etc.). A work item can generally include any type of digital or electronic content that can be viewed or accessed via an electronic device (e.g., device 102). For example, the digital content can include .pdf files, .doc files, slides (e.g., Powerpoint slides), images, audio files, multimedia content, web pages, blogs, etc. A workspace generally refers to a grouping of a set of digital content in the collaboration platform that is associated with one or more users (e.g., collaborators 108a and 108b). The grouping can be created, identified, or specified by a user or through other means. This user may be a creator user, an editing user or administrative user, for example.

In general, a workspace can be associated with a set of users or collaborators (e.g., collaborators 108a and 108b) which have access to the content included therein. The levels of access (e.g., based on permissions or rules) of each user or collaborator to access the content in a given workspace may be the same or may vary among the users. Each user may have access rights associated with particular content in the workspace, each user may have access rights based on policies or rules, or upon some combination thereof. Access rights may be specified by a user associated with a workspace and/or a user who created/uploaded a particular piece of content to the workspace, or another designated user or collaborator.

In general, the collaboration platform of FIG. 1 allows multiple users or collaborators to access or collaborate (e.g., work jointly) on work items. For example, each collaborating user can see, remotely, edits, revisions, comments, or annotations being made to specific work items by themselves or others through their own user devices. Each collaborating user can see additions of work items and can see when the work items have been deleted. For example, a user can upload a document to a workspace for other users to access, view, edit, comment, sign-off, or otherwise manipulate. The user can login to the online platform and upload the document (or any other type of work item) to an existing workspace or to a new workspace. The document can be shared with existing users or collaborators in a workspace.

In one embodiment, the host server 100 of cloud-based services and/or cloud storage such as an online or web-based collaboration environment is able to track or monitor the devices used by users to access content or perform activities, such as for example adding, deleting, or modifying collaborators in a workspace, uploading, downloading, adding, deleting a work item in the workspace, and/or creating a discussion topic in the workspace.

In one embodiment, client devices 102 communicate with the host server 100 and/or notification server 150 over network 106. In general, network 106, over which the client devices 102, the host server 100, and/or notification server 150 communicate, may be a cellular network, a telephonic network, an open network, such as the Internet, or a private network, such as an intranet and/or the extranet, or any combination thereof. For example, the Internet can provide file transfer, remote log in, email, news, RSS, cloud-based services, instant messaging, visual voicemail, push mail, VoIP, and other services through any known or convenient protocol, such as, but is not limited to the TCP/IP protocol, Open System Interconnections (OSI), FTP, UPnP, iSCSI, NSF, ISDN, PDH, RS-232, SDH, SONET, etc.

The network 106 can be any collection of distinct networks operating wholly or partially in conjunction to provide connectivity to the client devices 102 and the host server 100 and may appear as one or more networks to the serviced systems and devices. In one embodiment, communications to and from the client devices 102 can be achieved by, an open network, such as the Internet, or a private network, such as an intranet and/or the extranet. In one embodiment, communications can be achieved by a secure communications protocol, such as secure sockets layer (SSL), or transport layer security (TLS).

In addition, communications can be achieved via one or more networks, such as, but are not limited to, one or more of WiMax, a Local Area Network (LAN), Wireless Local Area Network (WLAN), a Personal area network (PAN), a Campus area network (CAN), a Metropolitan area network (MAN), a Wide area network (WAN), a Wireless wide area network (WWAN), enabled with technologies such as, by way of example, Global System for Mobile Communications (GSM), Personal Communications Service (PCS), Digital Advanced Mobile Phone Service (D-Amps), Bluetooth, Wi-Fi, Fixed Wireless Data, 2G, 2.5G, 3G, 4G, IMT-Advanced, pre-4G, 3G LTE, 3GPP LTE, LTE Advanced, mobile WiMax, WiMax 2, WirelessMAN-Advanced networks, enhanced data rates for GSM evolution (EDGE), General packet radio service (GPRS), enhanced GPRS, iBurst, UMTS, HSPDA, HSUPA, HSPA, UMTS-TDD, 1×RTT, EV-DO, messaging protocols such as, TCP/IP, SMS, MMS, extensible messaging and presence protocol (XMPP), real time messaging protocol (RTMP), instant messaging and presence protocol (IMPP), instant messaging, USSD, IRC, or any other wireless data networks or messaging protocols.

Figure 2:
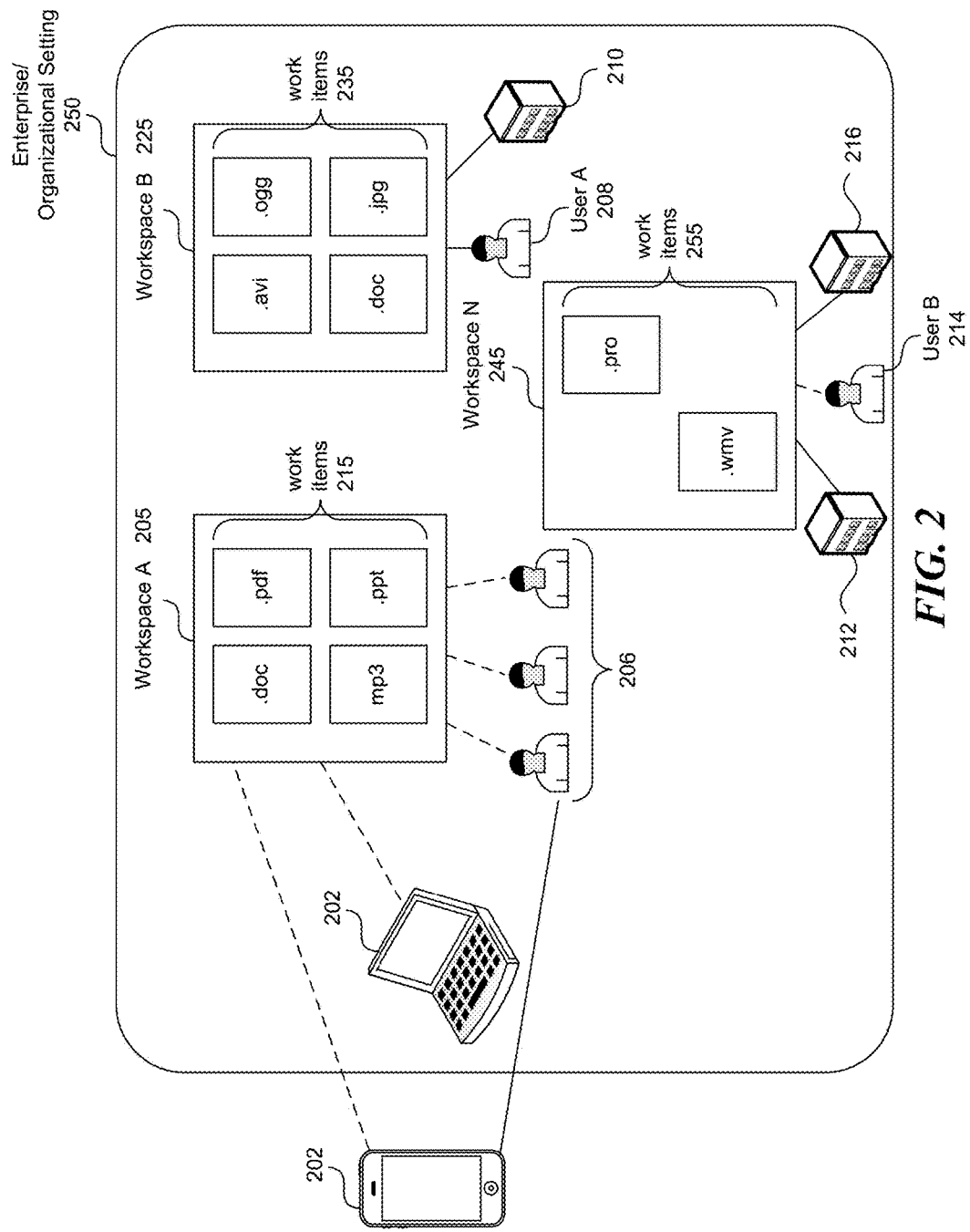
FIG. 2 contains a diagram illustrating an exemplary web-based or online collaboration platform, deployed in an enterprise or other organizational setting for organizing work items and workspaces, with capabilities for secure cross-domain login thereto.

A diagrammatic illustration of the online collaboration environment and the relationships between workspaces and users/collaborators are illustrated with further reference to the example of FIG. 2. A diagrammatic illustration of a workspace having multiple work items with which collaborators can access through multiple devices is illustrated with further reference to the example of FIG. 3.

FIG. 2 contains a diagram illustrating an exemplary web-based or online collaboration platform deployed in an enterprise or other organizational setting 250 for organizing work items 215, 235, 255 and workspaces 205, 225, 245, as one example of a collaboration or file and/or service sharing service which may be or include hosted cloud service and/or cloud storage, with capabilities for secure cross-domain login thereto.

The web-based platform for collaborating on projects or jointly working on documents can be used by individual users and shared among collaborators. In addition, the collaboration platform can be deployed in an organized setting including but not limited to, a company (e.g., an enterprise setting), a department in a company, an academic institution, a department in an academic institution, a class or course setting, or any other types of organizations or organized setting.

When deployed in an organizational setting, multiple workspaces (e.g., workspace A, B, . . . N) can be created to support different projects or a variety of work flows. Each workspace can have its own associated work items. For example, workspace A 205 is associated with work items 215, workspace B 225 is associated with work items 235, and workspace N is associated with work items 255. The work items 215, 235, and 255 may be unique to each workspace, but need not be. For example, a particular word document can be associated with only one workspace (e.g., workspace A 205) or it may be associated with multiple workspaces (e.g., workspace A 205 and workspace B 225, etc.).

In general, each workspace has a set of users or collaborators associated with it. For example, workspace A 205 is associated with multiple users or collaborators 206. In some instances, workspaces deployed in an enterprise may be department specific. For example, workspace B 225 is associated with department 210 and user group A 208, and workspace N 245 is associated with departments 212 and 216 and user group B 214.

Each user associated with a workspace can generally access the work items associated with the workspace. The level of access will depend on permissions associated with the specific workspace, and/or with a specific work item. Permissions may be set for the workspace or set individually on a per work item basis. For example, the creator of a workspace (e.g., one of user A 208 who creates workspace B) can set one permission setting applicable to all work items 235 for other associated users and/or users associated with the affiliate department 210. User group A 208 may also set different permission settings for each work item, which may be the same for different users, or varying for different users.

In each workspace A, B, . . . N, when an action is performed on a work item by a given user or any other activity is detected in the workspace, other users in the same workspace may be notified (e.g., in real time or in near real time, or not in real time). Activities which trigger real time notifications may include, by way of example but not limitation, adding, deleting, or modifying collaborators in a workspace, uploading, downloading, adding, deleting a work item in the workspace, and/or creating a discussion topic in the workspace.

Specifically, items or content downloaded or edited in accordance with the techniques described in the present disclosure may cause notifications to be generated. Such notifications may be sent to relevant users to notify them of actions surrounding a download, an edit, a change, a modification, a new file, a conflicting version, an upload of an edited or modified file.

In one embodiment, in a user interface to the web-based collaboration platform where notifications are presented, users can, via the same interface, create action items (e.g., tasks) and delegate the action items to other users including collaborators pertaining to a work item 215, for example. The other users can be collaborators 206 in the same workspace A 205 or a newly invited collaborator. Similarly, in the same user interface where discussion topics can be created in a workspace (e.g., workspace A, B, . . . N, etc.), actionable events on work items can be created and/or delegated/assigned to other users such as collaborators of a given workspace 206 or other users. Through the same user interface, task status and updates from multiple users or collaborators can be indicated and reflected. In some instances, the users can perform the tasks (e.g., review or approve or reject, etc.) via the same user interface.

Figure 3:
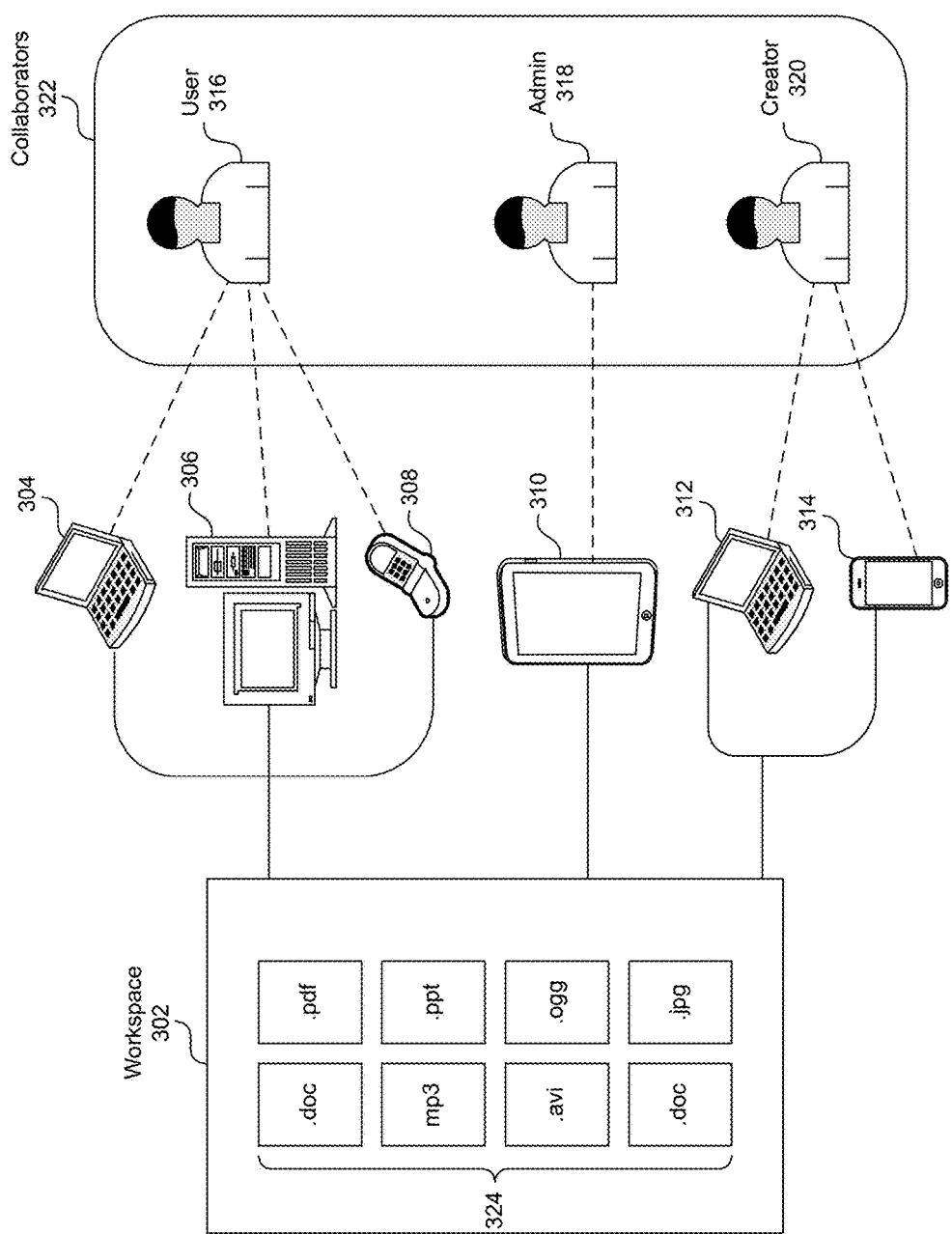
FIG. 3 contains a diagram illustrating an exemplary workspace in an online or web-based collaboration environment, accessible by multiple collaborators through various devices authorized to access the workspace, with capabilities for secure cross-domain login.

FIG. 3 contains a diagram illustrating an exemplary workspace 302 in an online or web-based collaboration environment. Exemplary workspace 302 is accessible by multiple collaborators 322 through various devices authorized to access the workspace. Also, exemplary workspace 302 is configured for secure cross-domain login.

Each of users 316, 318, and 320 can individually use multiple different devices to access and/or manipulate work items 324 in the workspace 302 with which they are associated with. For example users 316, 318, 320 can be collaborators on a project to which work items 324 are relevant. Since the work items 324 are hosted by the collaboration environment (e.g., a cloud-based environment), each user can access the work items 324 at different or the same times, and from different or the same physical location using various devices.

Work items to be edited or viewed can be accessed from the workspace 302 in accordance with the platform and/or application independent mechanisms. Users can also be notified of access, edit, modification, and/or upload related-actions performed on work items 324 by other users or other types of activities detected in the workspace 302. For example, if user 316 modifies a document, one or both of the other collaborators 318 and 320 can be notified of the modification in real time, or near real-time, or not in real time. The notifications can be sent through any of all of the devices associated with a given user, in various formats including, one or more of, email, SMS, or via a pop-up window in a user interface in which the user uses to access the collaboration platform. In the event of multiple notifications, each notification can be depicted preferentially (e.g., ordered in the user interface) based on user preferences and/or relevance to the user (e.g., implicit or explicit).

For example, a notification of a download, access, read, write, edit, or uploaded related activities can be presented in a feed stream among other notifications through a user interface on the user device according to relevancy to the user determined based on current or recent activity of the user in the web-based collaboration environment.

In one embodiment, a notification feed stream includes updates when an invited user accepts an invitation and/or successfully creates a new account through receipt of an invitation from an existing user. The invited user, upon creation of the new account, receives the account having enhanced features. The new user can automatically be connected to the existing user who sent the invitation. The system can also automatically prompt both users to query whom they wish to be collaborators in a common workspace.

Figure 4:
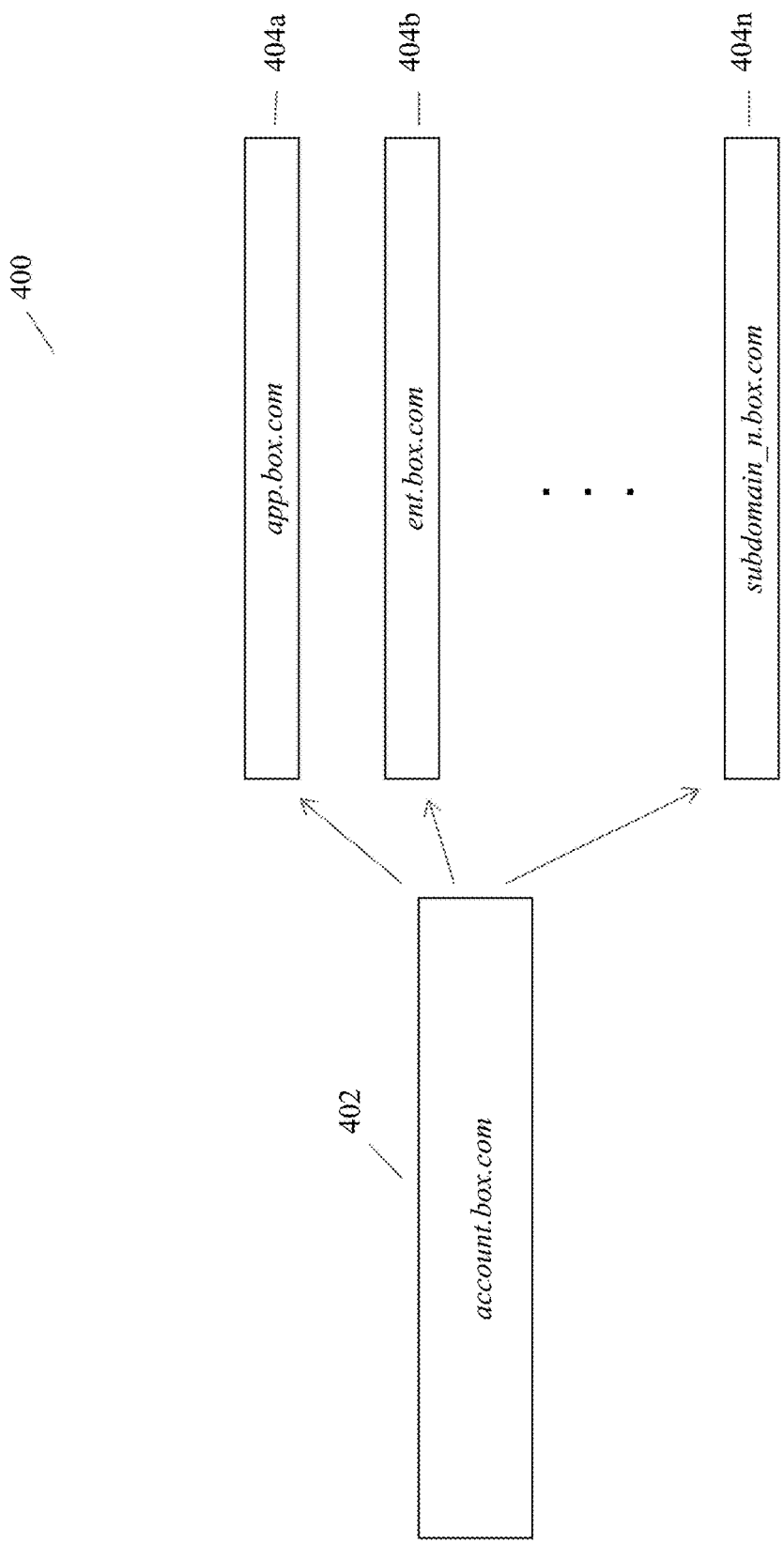
FIG. 4 is a schematic diagram illustrating relationships between an exemplary domain and its subdomains used to perform secure cross-domain login to open a session on a cloud-based collaboration platform.

FIG. 4 is a schematic diagram illustrating a top level domain and exemplary subdomains 400. In the context of the Internet, a domain is a part of a network that is managed under common procedures. Typically, a domain is associated with an IP address. A subdomain is a part of the domain. In the exemplary illustration in FIG. 4, top level domain 402 (account.box.com) contains subdomains 404a, 404b, up to and including 404n, which are named, respectively, app.box.com, ent.box.com, . . . , subdomain_n.box.com. It should be appreciated that the specific domain names are for illustrative purposes and are not meant to be limiting.

Figure 5:
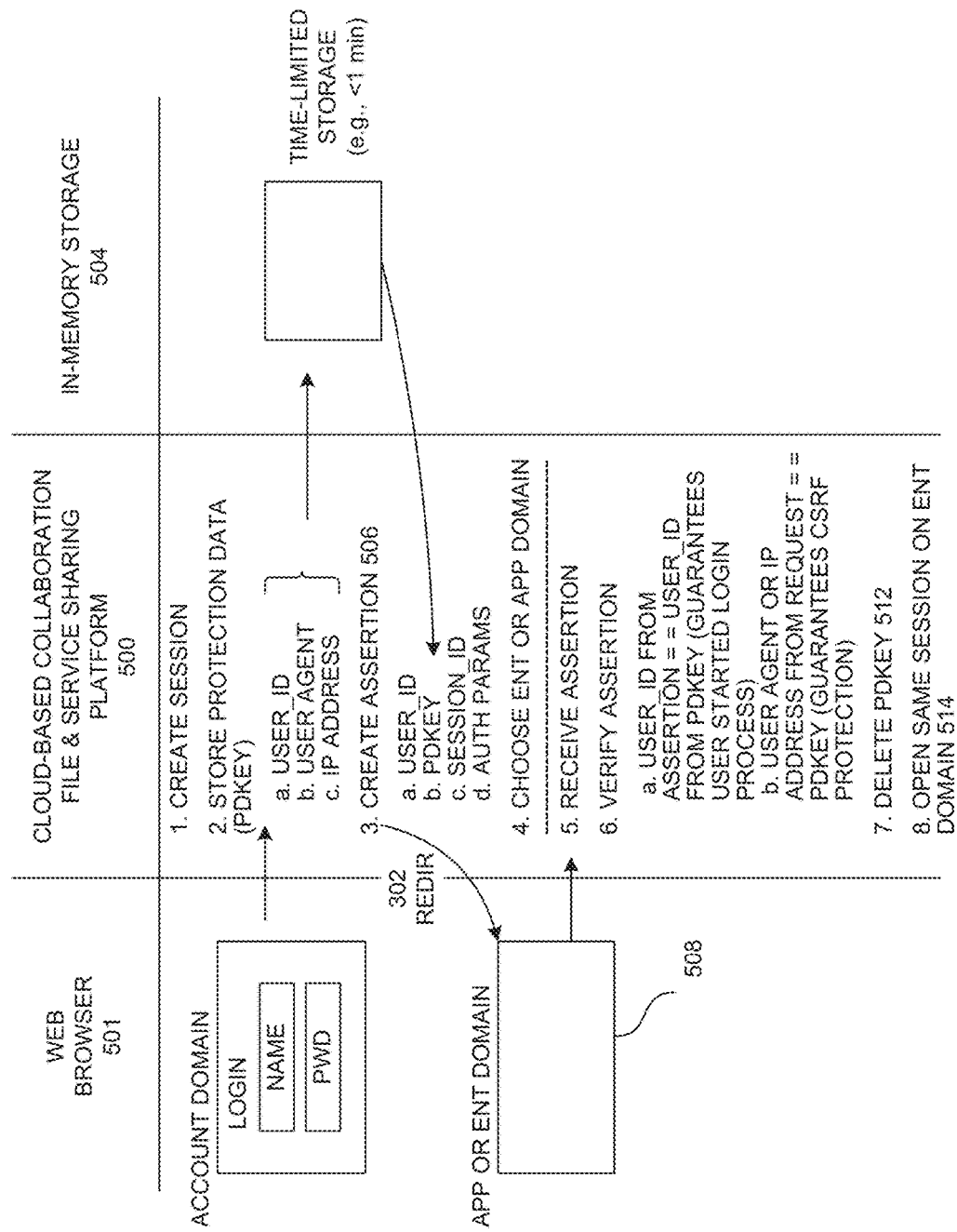
FIG. 5 depicts an exemplary system for secure cross-domain login to open a session on a cloud-based file and/or service collaboration platform in a first domain.

FIG. 5 depicts an exemplary system for secure cross-domain login with the intention to open a session on a cloud-based file and/or service collaboration platform 500 (the "platform") in a first domain. In an embodiment, platform 500 receives a communication from a web browser 501, e.g., a client-side web browser at a remote location. The communication is a request to create a session at the first domain on the platform, e.g., account domain or account.box.com. The request includes user identification-related information, e.g., a user login name and password. In another embodiment, the user-related identification information is provided as any of the following non-limiting, exemplary methodologies: user login name only, a personal identification number (PIN), biometric information (e.g., fingerprint, retina and iris patterns), question and answer exchanges between the user and the identity provider, and so on. The request may include other optional data, e.g., application data. For example, platform 500 may use the application data on behalf of the user to obtain the appropriate token from an identity provider.

Figure 6:
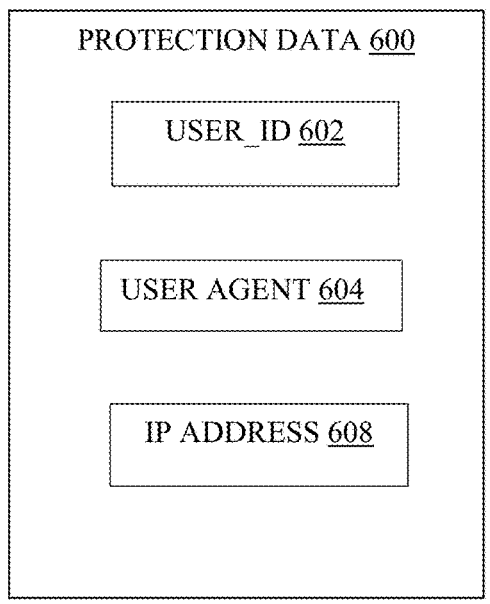
FIG. 6 is a schematic diagram illustrating an exemplary data structure of protection data.

Subsequent to creating the session, platform 500 stores particular data, referred to herein as protection data, in an in-memory storage 504. An embodiment can be understood with reference to FIG. 6, a schematic diagram illustrating an exemplary data structure of protection data. In an embodiment, the protection data 600 includes user identification information 602, user agent information 604, and an IP address 608, e.g., an IP address associated with the browser, user, account, or device. Examples of user agent information include information about the browser, information about the system from which the browser operates, and/or machine configuration information from which the browser operates. One skilled in the art would readily recognize the following example of a user agent as including but not being limited to: Mozilla/5.0 (Macintosh; Intel Mac OS X 10_11_6) AppleWebKit/537.36 (KHTML, like Gecko) Chrome/54.0.2840.98 Safari/537.36. In an embodiment, the protection data is stored in in-memory storage 504 for a short period of time such as for example less than one minute.

Figure 7:
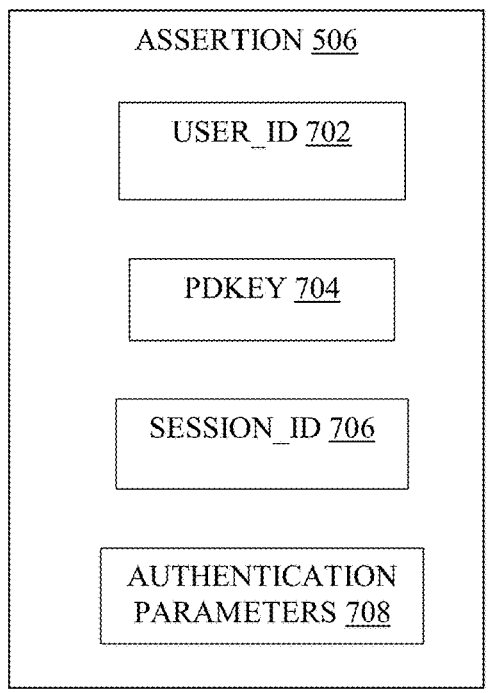
FIG. 7 is a schematic diagram illustrating an exemplary data structure of an assertion.

Next, platform 500 creates an assertion 506. An embodiment of an assertion can be understood with reference to FIG. 7, a schematic diagram illustrating an exemplary data structure of an assertion. In an embodiment, assertion 506 includes the user identification information 702, a protection data key 704 that is used subsequently to retrieve the protection data, a session identifier (session ID) 706 including information regarding the particular subdomain to which the session is redirected (e.g., app.box.com or ent.box.com), and other optional and/or relevant information 708 such as for example authentication parameters for a particular application or basic information for application purposes, e.g., application login. An example of a session ID is q14isp3j1n4t0edo7k36i5h1e4. An example of authentication parameters includes OAuth 2.0 compliant authentication parameters, as described within the Internet Engineering Task Force (IETF), ISSN: 2070-172, The OAuth 2.0 Authorization Framework, which is hereby incorporated by reference. The process for authenticating the user identification information is readily understood and implemented by one or ordinary skill in the art. In one embodiment, the authentication codes issued are securely provided for previously agreed-upon proper, authorized subdomains. In another embodiment, the protection data is not included in the assertion but is transmitted separately with the assertion. In another embodiment, the transmission includes an assertion key, which includes the user identification information, the session identifier information, and the authentication parameters. In another embodiment, the assertion data and the protection data may be each or both encrypted, signed, and transmitted separately.

In an embodiment, platform 500 determines which subdomain to redirect browser 501. It should be appreciated that the number of available subdomains and the criteria for choosing which subdomain are not limiting. For example, in one embodiment, the browser can request to open a session at account.box.com 402, i.e. at a single point of entry. Then, responsive to receiving the open session request, platform 500 can decide, based on rules, whether to redirect browser 501 and, if so, to which subdomain, e.g., to app.box.com 404a or ent.box.com 404b. As an example, a rule may indicate to stay at root domain 402 when certain criteria are met and go to subdomain 404a or 404b when other criteria are met.

In another embodiment, platform 500 matches the input user information with previously stored user information to determine the type of account and which subdomain to redirect the browser (not shown). In another embodiment, a cookie is dropped onto the base domain (e.g., account.box.com) to indicate which subdomain (e.g., app.box.com or ent.box.com) to redirect, e.g., based on user identification information, a particular browser. Examples of reasons to redirect a browser to particular subdomains include but are not limited to depending on tracking behavior, e.g., tracking user interactions with a work item, or for securing enterprise access.

Further, it should be appreciated that such process of secure cross-domain login enables cancelations of logins easier and more secure. For example, when a user of a subdomain, e.g., ent.box.com 404b, requests to log out, platform 500 performs similar operations to log out of the specific application, the subdomain (e.g., ent.box.com 404b), and platform 500 cleanly.

In the embodiment as illustrated, platform 500 verifies whether the create session request qualifies for an enterprise domain 508. In an embodiment, a rule or process within platform 500 chooses whether the create session request is redirected to a personal account on one domain (e.g. app.box.com 404a) or redirected to an enterprise account on another domain (e.g., ent.box.com 404b). In an example implementation, an enterprise adds network controls to restrict personal users and trial accounts. That is, some enterprises use the platform as an approved enterprise tool but block access to personal accounts due to security and compliance concerns. Another enterprise may find that it needs to or wants to collaborate with organizations that block the platform due to concerns over personal users sharing files. Thus, to mitigate this situations, the enterprise subdomain configuration described herein provides a mechanism that allows enterprises to easily block personal users on internal networks while allowing use of and access to the platform, via the enterprise subdomain, for verified users.

In another example implementation, an enterprise allows access to the platform on networks that restrict platform access to personal users. For example, some networks, including company networks and network providers, and certain countries or regions attempt to control unauthorized file sharing with network level restrictions by blocking a certain domain. Thus, by employing the cross-domain login system described herein, such networks have the tools to differentiate between enterprise accounts, which companies often do not want to block, and personal accounts. A cross-domain login system also may permit bypass of the restrictions placed on personal accounts on the platform.

According to an embodiment and as shown in FIG. 5, platform 500 redirects browser 501 to open the intended session on the new subdomain, for example the enterprise subdomain (ent.box.com), with assertion 506. In an embodiment, the redirect is a URL redirection response (e.g., an HTTP 11.1 302 Found redirect response). In an embodiment, the assertion is used once and is transmitted as an encrypted and signed data structure.

In response to the redirect, platform 500 receives assertion 506 from browser 501 along with the open session request and verifies assertion 506. For example, in an embodiment, platform 500 takes the protection data key from assertion 506 and uses protection data key to retrieve the protection data from in-memory storage 504. Then, platform 500 checks that the user identification information from assertion 506 is equivalent to the user identification information from the retrieved protection data. In an embodiment, checking whether the user identification information is equivalent guarantees that the current user associated with the user identification information started the original login process him- or herself. Platform 500 also checks that the user agent information and/or IP address from assertion 506 is equivalent to the user agent information and/or IP address in the retrieved protection data. In an embodiment, checking whether the user agent information and/or IP address is equivalent guarantees Cross-Site Request Forgery (CSRF) protection. That is, this process protects against when, before browser 501 verifies assertion 506, the 302 redirect is intercepted and responded to, such that the user logging in appears as an imposter. Here, the use of the stored protection data ensures the original user can continue to login at the redirect location, i.e. the subdomain (e.g., app.box.com 404a or ent.box.com 404b).

Platform 500 deletes protection data 512 after assertion 506 is verified.

Platform 500 opens the requested session on the new subdomain, for example the enterprise subdomain 514 (ent.box.com 404b).

FIG. 8 is a flow diagram illustrating an exemplary server flow for performing a secure cross-domain login 800. It should be appreciated that this particular flow is for illustrative purposes and is not meant to be limiting. For example, some steps may be omitted, other steps may be added, and/or some steps may be performed in different order, each embodiment thereof being within scope of the innovation.

In an embodiment, at step 802 a user at web browser 501 logs into an account domain using login information such as for example a username and optionally a password and makes a request to create a session. In an embodiment, the user logs in to the account domain via single sign on (SSO). In an embodiment the user is authenticated using their corporate login mechanism, which then transfers (e.g., via SAML) the user's identity back to the account domain (e.g., account.box.com subdomain), which then proceeds in the same manner as if the user logged in via user name and password. That is, the innovation provides a cross domain login mechanism that works with the SSO logins as well as the traditional name and password standard At step 804, platform server 500 receives at the account domain the session request and the user login information and verifies the user using known authentication techniques.

At step 806, subsequent to the user being verified, platform server 500 generates and stores protection data. In an embodiment, the protection data includes user identification information ("USER_ID"), user agent information, and/or the IP address. Platform server 500 stores such protection data in a time-limited storage 504.

At step 808, time-limited storage 504 receives the protection data from platform server 500 and stores such protection data for no more than one minute.

At step 810, platform server 500 generates an identifier for identifying the protection data stored in time-limited storage 504. For example, such protection data identifier is a key ("PDKEY").

At step 812, platform server 500 determines which subdomain to redirect the requested session. In an embodiment, platform server 500 chooses whether the subdomain will be the personal subdomain of the user (e.g., app.box.com or "app") or the corporate, enterprise subdomain (e.g., ent.box.com or "ent").

At step 814, platform server 500 generates an assertion. In an embodiment, the assertion includes the USER_ID, PDKEY, and a session identifier ("SESSION_ID") which identifies on which subdomain the requested session will be opened.

At step 816, platform server transmits the assertion to web browser 501. In an embodiment, the assertion is transmitted with a redirect request for the particular subdomain, e.g., for chosen ent or app subdomain.

At step 818, web browser 501 receives the assertion from platform server 500.

At step 820, web browser 501 transmits a request to platform server 500 to create the session at the particular subdomain. In an embodiment, web browser 501 transmits the request to platform server 500 to create the session at the chosen subdomain, e.g., app.box.com or ent.box.com.

At step 822, platform server 500 receives the assertion from web browser 501.

At step 824, platform server 500 parses the assertion and uses PDKEY from the assertion to retrieve the protection data from time-limited storage 504.

At step 826, time-limited storage 504 permits platform server 500 access to the protection data that is associated with PDKEY. After a pre-determined time, e.g., one minute since storing the protection data, time-limited storage 504 deletes the protection data.

At step 828, platform server 500 retrieves the protection data from time-limited storage 504 and verifies the assertion. In an embodiment, platform server 500 parses the protection data and compares USER_ID from the assertion to USER_ID from the protection data. Also, platform server 500 compares user agent or IP address from the assertion to the respective user agent or IP address from the protection data. If there are not matches to both comparisons, the request to open the session at the chosen subdomain is denied.

At step 830, both comparisons resulted in matches and platform server 500 opens the session on the chosen subdomain.

At step 832, in an embodiment, platform server 500 deletes extraneous data such as PDKEY.

Figure 9:
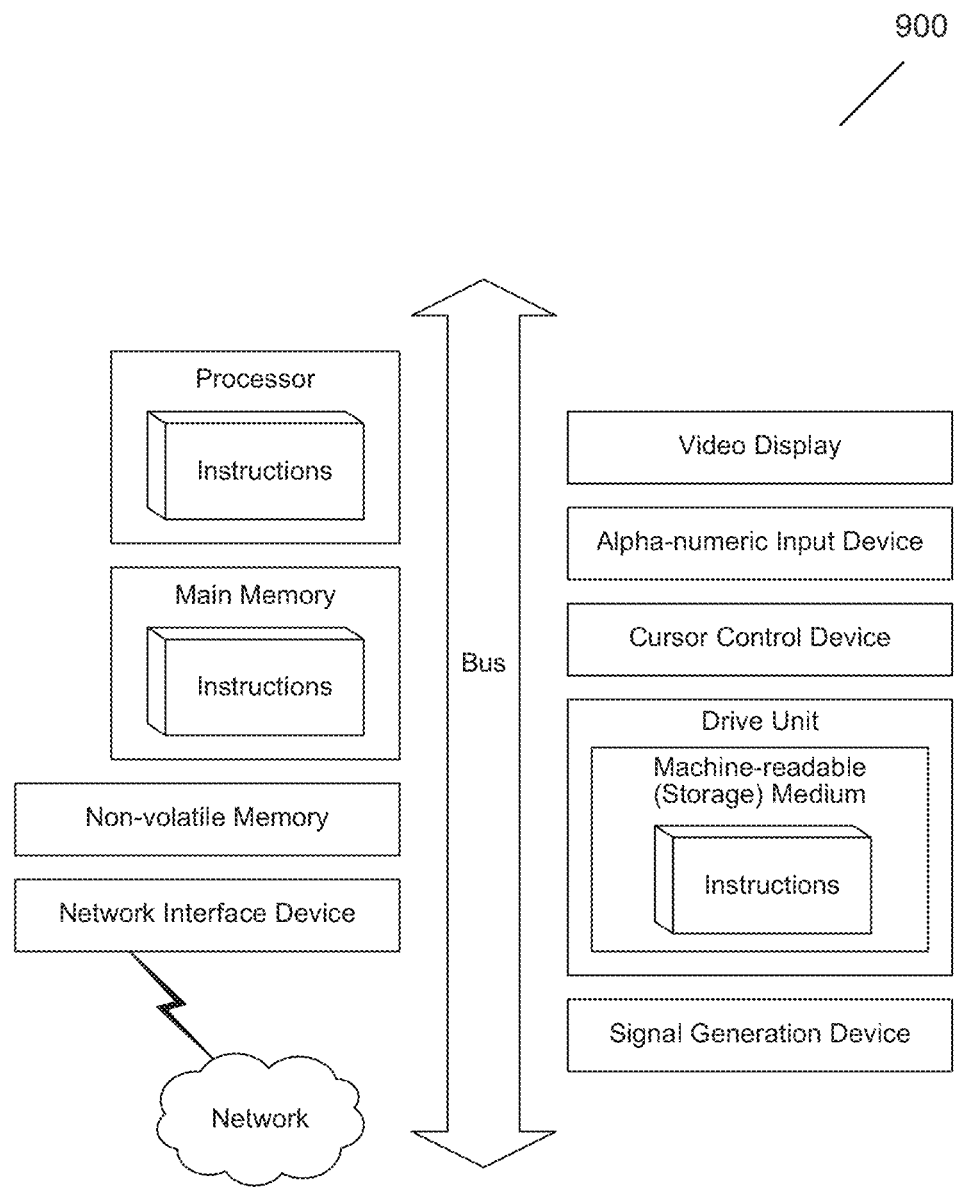
FIG. 9 shows a diagrammatic representation of a machine in the exemplary form of a computer system within which a set of instructions, for causing the machine to perform any one or more of the methodologies discussed herein, may be executed.

FIG. 9 shows a diagrammatic representation of a machine 900 in the exemplary form of a computer system within which a set of instructions, for causing the machine to perform any one or more of the methodologies discussed herein, may be executed.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a user device, a tablet PC, a laptop computer, a set-top box (STB), a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure, may be implemented as part of an operating system or a specific application, component, program, object, module or sequence of instructions referred to as "computer programs". The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include, but are not limited to, recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

The network interface device enables the machine 2800 to mediate data in a network with an entity that is external to the host server, through any known and/or convenient communications protocol supported by the host and the external entity. The network interface device can include one or more of a network adaptor card, a wireless network interface card, a router, an access point, a wireless router, a switch, a multilayer switch, a protocol converter, a gateway, a bridge, bridge router, a hub, a digital media receiver, and/or a repeater.

The network interface device can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including for example, the access and operation rights of an object by an individual, a machine, and/or an application, and the circumstances under which the permission rights stand.

Other network security functions can be performed or included in the functions of the firewall, can be, for example, but are not limited to, intrusion-prevention, intrusion detection, next-generation firewall, personal firewall, etc. without deviating from the novel art of this disclosure.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein", "above", "below", and words of similar import, when used in this application, shall refer to this application as a whole and not to any particular portions of this application. Where the context permits, words in the above Detailed Description using the singular or plural number may also include the plural or singular number respectively. The word "or", in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed in parallel, or may be performed at different times. Further, any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, if only one aspect of the disclosure is recited as a means-plus-function claim under 35 U.S.C. § 112, ¶6, 112(f), or their equivalent, other aspects may likewise be embodied as a means-plus-function claim, or in other forms, such as being embodied in a computer-readable medium. (Any claims intended to be treated under 35 U.S.C. § 112, ¶6, 112(f), or their equivalent, will begin with the words "means for".) Accordingly, the applicant reserves the right to add additional claims after filing the application to pursue such additional claim forms for other aspects of the disclosure.

What is claimed is:

1. A method for providing secure access to content in a cloud-based collaboration environment, comprising:
   receiving from a browser in a cloud-based collaboration environment a first request to open a session for accessing content, the first request comprising a first user identification, a first user agent, and a first Internet Protocol (IP) address;
   opening the session, authenticating the request, and upon a positive authentication, storing the first user identification information, the first user agent information, and the first IP address in memory as protection data;
   generating a protection data key for retrieving the stored protection data at a subsequent point in time;
   choosing a subdomain to which to redirect the first request as a second request to open a session for accessing the content;
   creating an assertion for the second request, the assertion comprising at least the first user identification, the protection data key, and session identification information;
   transmitting the assertion to the browser of the cloud-based collaboration environment;
   subsequent to transmitting the assertion to the browser, receiving from the browser the second request to open the session on the subdomain for accessing the content, the second request comprising the assertion along with a second user identification, a second user agent and a second IP address;
   verifying the assertion by comparing the second user identification, the second user agent or the second IP address to the protection data from the memory by:
      parsing the assertion and using the parsed protection data key to retrieve the protection data from the memory;
      parsing the retrieved protection data and comparing the first user identification and the first user agent or the first IP address to the second user identification and the second user agent or the second IP address, respectively; and
   upon a positive verification, opening the session on the subdomain and permitting to the browser access to the content.

2. The method of claim 1, wherein the cloud-based collaboration environment comprises cloud-based file sharing or a storage platform or service.

3. The method of claim 1, wherein the first user identification comprises any of: a user login name, a user login name and a password, login information via a single sign on (SSO) login, a personal identification number (PIN), biometric information (e.g., fingerprint, retina and iris patterns), and a question and answer exchange with an identity provider.

4. The method of claim 1, wherein the first user agent comprises information about the browser, information about the system from which the browser operates, and/or machine configuration information from which the browser operates.

5. The method of claim 1, wherein the memory stores the protection data for less than one minute.

6. The method of claim 1, wherein the assertion further comprises application parameters comprising authentication or login parameters for a particular application.

7. The method of claim 1, wherein the session identification information comprises information identifying the subdomain.

8. The method of claim 1, wherein choosing the subdomain further is based upon an evaluation of at least one of the first user identification, the first user agent, and the first IP address.

9. The method of claim 1, wherein choosing the subdomain further is based upon a previously stored cookie.

10. The method of claim 1, wherein transmitting the assertion to the browser is performed using a temporary redirect request.

11. The method of claim 1, wherein comparing the first user identification and the first user agent or the first IP address to the second user identification and the second user agent or the second IP address, respectively, further comprises:
   comparing both the first user agent and the first IP address to both the second user agent and the second IP address, respectively.

12. A system for providing secure access to content in a cloud-based collaboration environment, comprising:
   one or more processors;
   memory circuitry coupled to the one or more processors, the one or more processors performing:
      receiving from a browser in a cloud-based collaboration environment a first request to open a session for accessing content, the first request comprising a first user identification, a first user agent, and a first Internet Protocol (IP) address;
      opening the session, authenticating the request, and upon a positive authentication, storing the first user identification information, the first user agent information, and the first IP address in memory as protection data;
      generating a protection data key for retrieving the stored protection data at a subsequent point in time;
      choosing a subdomain to which to redirect the first request as a second request to open a session for accessing the content;
      creating an assertion for the second request, the assertion comprising at least the first user identification, the protection data key, and session identification information;
      transmitting the assertion to the browser of the cloud-based collaboration environment;
      subsequent to transmitting the assertion to the browser, receiving from the browser the second request to open the session on the subdomain for accessing the content, the second request comprising the assertion along with a second user identification, a second user agent and a second IP address;
      verifying the assertion by comparing the second user identification, the second user agent or the second IP address to the protection data from the memory by:
         parsing the assertion and using the parsed protection data key to retrieve the protection data from the memory;
         parsing the retrieved protection data and comparing the first user identification and the first user agent or the first IP address to the second user identification and the second user agent or the second IP address, respectively; and
      upon a positive verification, opening the session on the subdomain and permitting to the browser access to the content.

13. The system of claim 12, wherein the cloud-based collaboration environment comprises cloud-based file sharing or a storage platform or service.

14. The system of claim 12, wherein the first user identification comprises any of: a user login name, a user login name and a password, login information via a single sign on (SSO) login, a personal identification number (PIN), biometric information (e.g., fingerprint, retina and iris patterns), and a question and answer exchange with an identity provider.

15. The system of claim 12, wherein the first user agent comprises information about the browser, information about the system from which the browser operates, and/or machine configuration information from which the browser operates.

16. The system of claim 12, wherein the memory stores the protection data for less than one minute.

17. The system of claim 12, wherein the assertion further comprises application parameters comprising authentication or login parameters for a particular application.

18. The system of claim 12, wherein the session identification information comprises information identifying the subdomain.

19. The system of claim 12, further comprising:
   wherein comparing the first user identification and the first user agent or the first IP address to the second user identification and the second user agent or the second IP address, respectively, further comprises:
   comparing both the first user agent and the first IP address to both the second user agent and the second IP address, respectively.

20. A non-transitory machine-readable storage medium having stored thereon instructions which when executed by a processor perform secure cross-domain login on a cloud-based collaboration platform, the method comprising the steps of:
   receiving from a browser in a cloud-based collaboration environment a first request to open a session for accessing content, the first request comprising a first user identification, a first user agent, and a first Internet Protocol (IP) address;
   opening the session, authenticating the request, and upon a positive authentication, storing the first user identification information, the first user agent information, and the first IP address in memory as protection data;
   generating a protection data key for retrieving the stored protection data at a subsequent point in time;
   choosing a subdomain to which to redirect the first request as a second request to open a session for accessing the content;
   creating an assertion for the second request, the assertion comprising at least the first user identification, the protection data key, and session identification information;
   transmitting the assertion to the browser of the cloud-based collaboration environment;
   subsequent to transmitting the assertion to the browser, receiving from the browser the second request to open the session on the subdomain for accessing the content, the second request comprising the assertion along with a second user identification, a second user agent and a second IP address;
   verifying the assertion by comparing the second user identification, the second user agent or the second IP address to the protection data from the memory by:
      parsing the assertion and using the parsed protection data key to retrieve the protection data from the memory;
      parsing the retrieved protection data and comparing the first user identification and the first user agent or the first IP address to the second user identification and the second user agent or the second IP address, respectively; and upon a positive verification, opening the session on the subdomain and permitting to the browser access to the content.

* * * * *